(12) United States Patent
Castagnozzi et al.

(10) Patent No.: US 7,206,342 B1
(45) Date of Patent: Apr. 17, 2007

(54) MODIFIED GAIN NON-CAUSAL CHANNEL EQUALIZATION USING FEED-FORWARD AND FEEDBACK COMPENSATION

(75) Inventors: Daniel M. Castagnozzi, Lexington, MA (US); Keith Michael Conroy, Salem, NH (US); Warm Shaw Yuan, San Diego, CA (US); Omer Fatih Acikel, San Diego, CA (US)

(73) Assignee: Applied Micro Circuits Corp., San Diego, CA (US)

( * ) Notice: Subject to any disclaimer, the term of this patent is extended or adjusted under 35 U.S.C. 154(b) by 810 days.

(21) Appl. No.: 10/652,333

(22) Filed: Aug. 29, 2003

Related U.S. Application Data

(63) Continuation-in-part of application No. 10/317,439, filed on Dec. 12, 2002, now Pat. No. 7,149,938, and a continuation-in-part of application No. 10/262,334, filed on Oct. 1, 2002, now Pat. No. 7,054,387, and a continuation-in-part of application No. 10/077,332, filed on Feb. 15, 2002, now Pat. No. 6,915,464, and a continuation-in-part of application No. 10/020,426, filed on Dec. 7, 2001, now Pat. No. 7,024,599.

(51) Int. Cl.
*H04L 27/08* (2006.01)
(52) U.S. Cl. ............................ 375/233; 375/345
(58) Field of Classification Search ................ 375/233, 375/345
See application file for complete search history.

(56) References Cited

U.S. PATENT DOCUMENTS

| | | | | |
|---|---|---|---|---|
| 5,539,774 A | * | 7/1996 | Nobakht et al. | 375/232 |
| 6,031,866 A | * | 2/2000 | Oler et al. | 375/219 |
| 6,493,329 B1 | * | 12/2002 | Leung | 370/335 |

* cited by examiner

*Primary Examiner*—Temesghen Ghebretinsae
*Assistant Examiner*—Juan Alberto Torres
(74) *Attorney, Agent, or Firm*—Law Office of Gerald Maliszewski; Gerald Maliszewski

(57) ABSTRACT

A modified gain system and method are provided for non-causal channel equalization using feed-forward and feedback compensation. The method comprises: receiving a serial data stream first bit (present) input; comparing a second bit (past) value, received prior to the first bit input, to a third bit (future) value received subsequent to the first bit input; modifying the amplitude of the first bit input to compensate for the effect of the second and third bit values being equal; and, determining the value of the first bit input by comparing the amplitude modified first bit input to a Vopt threshold. When only one of the second and third bit values is a "1" value, a unity amplitude modifier is supplied. When the second and third bit values are a "1", a low amplitude modifier is supplied. When the second and third bit values are a "0", a high amplitude modifier is supplied.

24 Claims, 6 Drawing Sheets

INPUT LEVEL $D_1$ | Definite "1"
"0" If both past and future bit values = "1"
"1" Otherwise $V_{opt}$ | ————
"1" If both past and future bit values = "0"
"0" Otherwise $D_0$ | Definite "0"

| Amplitude modifier | Second bit value | Third bit value |
|---|---|---|
| Low | 1 | 1 |
| High | 0 | 0 |
| Unity | 1 | 0 |
| Unity | 0 | 1 |

US 7,206,342 B1

MODIFIED GAIN NON-CAUSAL CHANNEL EQUALIZATION USING FEED-FORWARD AND FEEDBACK COMPENSATION

RELATED APPLICATIONS

This application is a continuation-in-part of a application entitled, SYSTEM AND METHOD FOR NON-CAUSAL CHANNEL EQUALIZATION, invented by Castagnozzi et al., Ser. No. 10/020,426, filed Dec. 7, 2001 now U.S. Pat. No. 7,024,599.

This application is a continuation-in-part of a application entitled, SYSTEM AND METHOD FOR NON-CAUSAL CHANNEL EQUALIZATION USING ERROR STATISTIC DRIVEN THRESHOLDS, invented by Castagnozzi et al., Ser. No. 10/077,332, filed Feb. 15, 2002 now U.S. Pat. No. 6,915,464.

This application is a continuation-in-part of a application entitled, FEED-FORWARD/FEEDBACK SYSTEM AND METHOD FOR NON-CAUSAL CHANNEL EQUALIZATION, invented by Yuan et al., Ser. No. 10/262,334, filed Oct. 1, 2002 now U.S. Pat. No. 7,054,387.

This application is a continuation-in-part of a application entitled, NON-CAUSAL CHANNEL EQUALIZATION, invented by Acikel et al., Ser. No. 10/317,439, filed Dec. 12, 2002 now U.S. Pat. No. 7,149,938.

BACKGROUND OF THE INVENTION

1. Field of the Invention

This invention generally relates to digital communications and, more particularly, to a system and method for minimizing the effects of inter-symbol interference (ISI) in a data channel of binary coded information using modified gain feed-forward/feedback compensation.

2. Description of the Related Art

FIG. 1 is a diagram illustrating a signal recovered from a binary symmetric, non-dispersive channel in the presence of noise (prior art). Conventionally, the signal is filtered with a transfer function matched to the signaling waveform (in this case a one unit step) and thresholded at the voltage level most likely to yield the transmitted bit. To recover the transmitted information, a hard decision must be made on the value of the received bit.

As a function of the filtering process, and sometimes as a result of the transmission process, pulse spreading occurs. That is, the energy associated with a bit spreads to neighboring bits. For small degrees of spreading these effects of this can be limited to the nearest neighbors with modest degradation in performance.

Three basic types of pulse spreading exist. The first possibility is that both the neighboring bits are a zero (no neighboring bits are a one). The second possibility is that only one of the neighboring bits (either the preceding or subsequent bit) is a one. Alternately stated, only one of the neighboring bits is a zero. The third possibility is that both neighboring bits are one. For each of these cases the likelihood of error in determining a bit value can be minimized if a different thresholds are used for different bit combinations.

FIG. 2 is a diagram illustrating received waveforms that are distorted in response to the inter-symbol interference resulting from energy dispersion (prior art). The value at the output of the filter varies with each bit, and is essentially a random process, due to the non-deterministic nature of the information, and scrambling that is often used in the transmission of data streams. However, received bits can be characterized with probability density functions (PDFs), as shown. Without knowledge of the neighboring bits, a single probability density function could be extracted that represents the random behavior of the input over all conditions and all sequences. However, conditional probability density functions can be defined for the three cases mentioned above. Namely, probability density functions can be defined for the cases where there are zero neighboring ones, only one neighboring one, and two neighboring ones.

If the bit value decision process could be made using the knowledge of the decision made on the preceding decoded bit, and with a measurement of a subsequent decoded bit, then the corresponding probability density function could be selected to make a more accurate decision on the current bit decision. However, the cost and accuracy of conventional analog-to-digital (A/D) conversion circuits make such a solution impractical.

The degree of dispersion exhibited by a channel, and hence the separation of the conditional probability density functions, varies in response to a number of fixed and variable factors. Effective dispersion mitigation techniques must therefore be easily optimized to the channel and somewhat adaptive to changes in the channel due to aging, temperature changes, reconfiguration, and other possible influences.

It would be advantageous if inter-symbol interference caused by energy dispersion in a received data channel could be minimized.

It would be advantageous if a received channel threshold could be maintained at a constant value, while compensating for the effects of inter-symbol interference.

It would be advantageous if the received channel amplitude could be modified to take account of the dispersed energy in the neighboring bits in the data stream.

SUMMARY OF THE INVENTION

Many communication channels exhibit temporal spreading of the signaling waveform when propagating over long distances or over non-linear media. Similar temporal spreading can occur in the cabling between circuit boards, on a circuit board, or even within an integrated circuit due to improper impedance matching. This phenomenon is not effectively addressed by traditional linear equalization techniques due to the non-causal nature of the impairment. A system and method are presented herein to reduce the effects of pulse spreading on hard-decision error rate in communication systems affected by this problem. The method utilizes a single decision threshold for all data bits, and modifies the received channel amplitude to account for previously received and subsequently received data bits, for optimal mitigation of the spreading effect.

The present invention approach to this problem is to perform multiple decisions on every bit, with a received channel amplitude or gain adjustment for each of the above-mentioned conditional probability density functions. The multiple decision data is stored to allow a calculation to be made on the succeeding bits. This calculation is then used to select the gain most appropriate given the estimated neighbor values. The refined decision is output from the device and fed-forward to be used in processing of subsequent bits.

Accordingly, a modified gain method is provided for a non-causal channel equalization communications system using feed-forward and feedback compensation. The method comprises: receiving a serial data stream first bit (present) input; establishing a comparator threshold (Vopt) to distinguish "1" bit values from "0" bit values; comparing a second bit (past) value, received prior to the first bit input, to a third bit (future) value received subsequent to the first bit input; in response to the comparisons, modifying the amplitude of the first bit input to compensate for the effect of the second and third bit values being equal; and, determining the value of the first bit input by comparing the amplitude modified first bit input to the Vopt threshold.

For example, when comparing a second bit value to a third bit value includes only one of the second and third bit values being a "1" value, then modifying the amplitude of the first bit input includes supplying a unity amplitude modifier in response to only one of the second and third bit values being a "1" value. When both the second and third bit values are a "1" value, a low amplitude modifier is supplied in response to both the second and third bit values being a "1" value. Likewise, when the second and third bit values are a "0" value, a high amplitude modifier is supplied in response to both the second and third bit values being a "1" value.

Additional details of the above-described method, and a modified gain feed-forward/feedback non-causal channel equalization communication system are provided below.

DETAILED DESCRIPTION OF THE PREFERRED EMBODIMENTS

Figure 1:
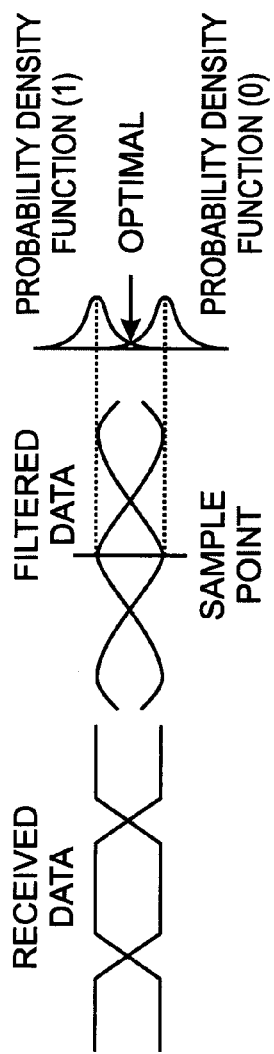
FIG. 1 is a diagram illustrating a signal recovered from a binary symmetric, non-dispersive channel in the presence of noise (prior art).
Figure 2:
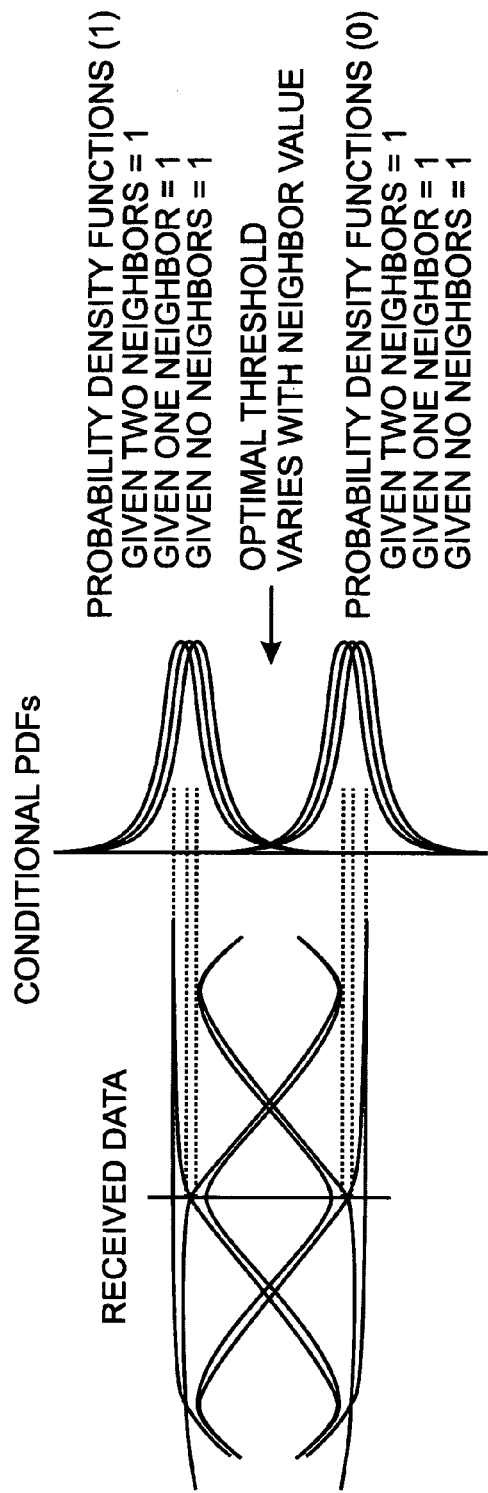
FIG. 2 is a diagram illustrating received waveforms that are distorted in response to the inter-symbol interference resulting from energy dispersion (prior art).
Figure 3:
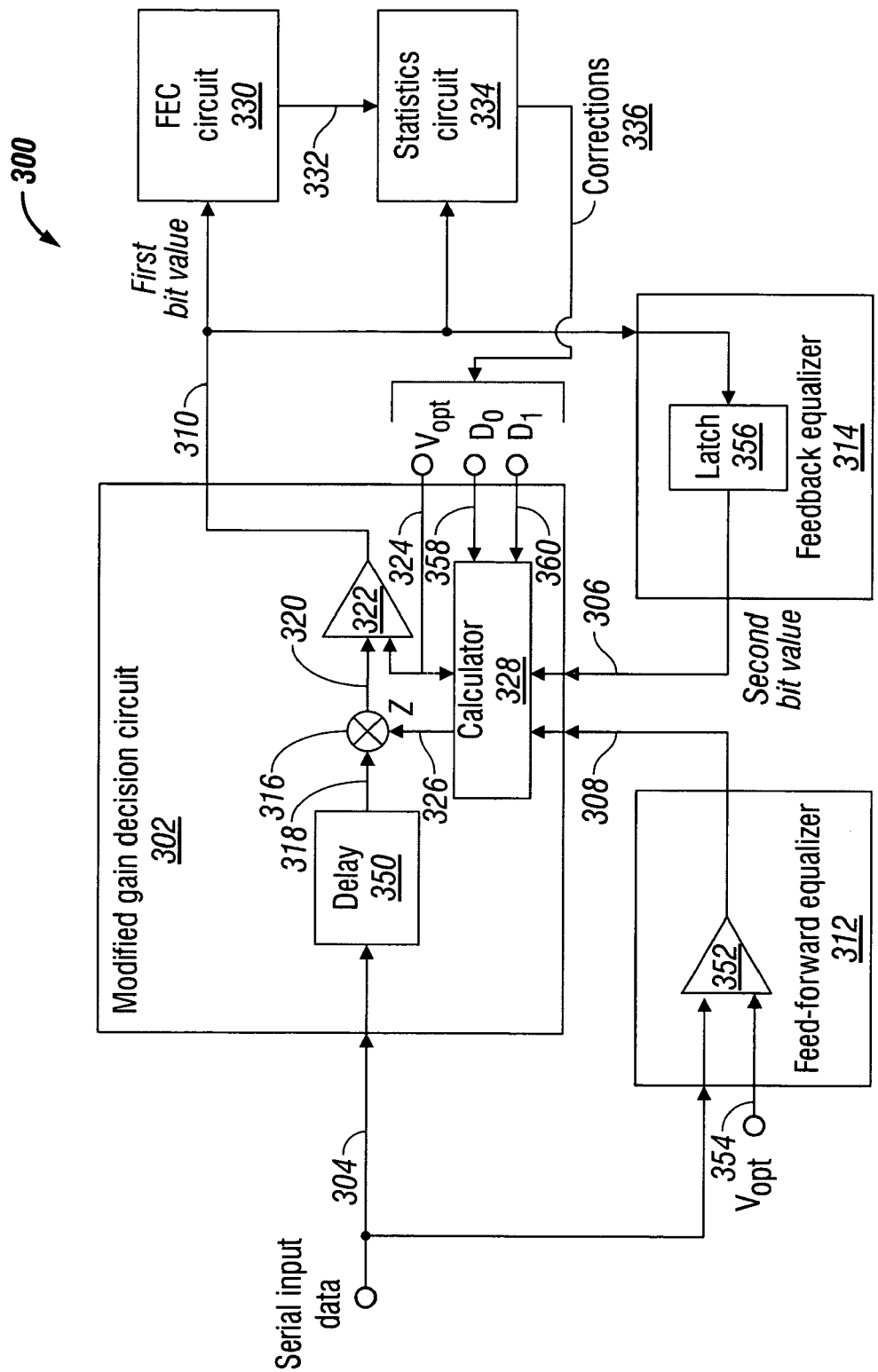
FIG. 3 is a schematic block diagram of the present invention modified gain non-causal channel equalization communication system using feed-forward and feedback compensation.

FIG. 3 is a schematic block diagram of the present invention modified gain non-causal channel equalization communication system using feed-forward and feedback compensation. The system 300 comprises a modified gain decision circuit 302 having an input on line 304 to accept a serial data stream and an input on line 306 to accept a second bit (past) value received prior to a first bit (present) input.

The modified gain decision circuit 302 has an input on line 308 to accept a third bit (future) value received subsequent to the first bit input and an output on line 310 to supply a first bit value responsive to the second and third bit values.

Figure 4:
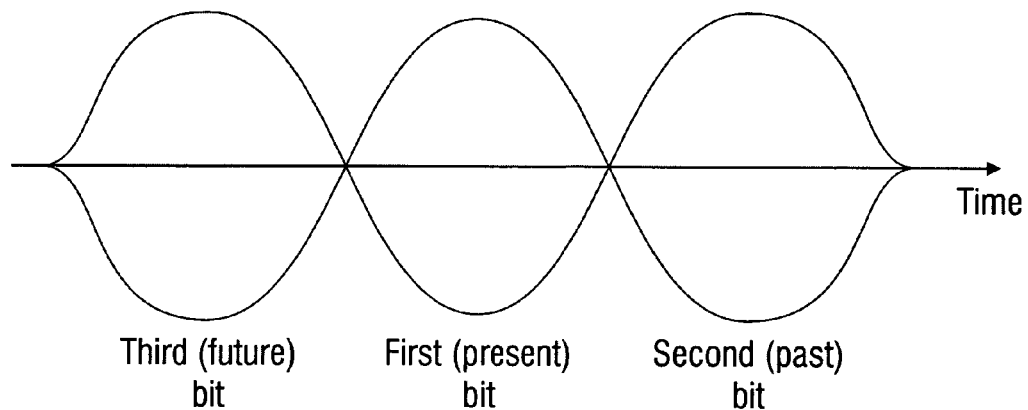
FIG. 4 is a diagram depicting the serial stream data, to illustrate the relative positions of the first, second, and third bits.

FIG. 4 is a diagram depicting the serial stream data, to illustrate the relative positions of the first, second, and third bits. It should be understood that the first bit for example, at one moment in time, is the third bit respective to a previously received bit and that the first bit is the second bit with respect to a subsequently received bit.

Returning to FIG. 3, a feed-forward equalizer 312 has an input to accept the serial data stream on line 304 and an output on line 308 to supply third bit values. A feedback equalizer 314 has an input on line 310 to accept first bit values and an output on line 306 to supply second bit values.

The modified gain decision circuit 302 includes a multiplier 316 having an input on line 318 to accept first bit inputs and an output on line 320 to supply amplitude modified first bit inputs. The multiplier 316 may be enabled, for example, as an amplifier. However, the invention is not limited to any particular multiplier implementation. A first comparator 322 has an input on line 320 to accept the amplitude modified first bit input and an input on line 324 to accept a Vopt comparator threshold. The first comparator 322 has an output on line 310 to supply the first bit values. The multiplier 316 further includes an input on line 326 to accept an amplitude modifier signals (z).

The modified gain decision circuit 302 further includes a calculator circuit 328 having inputs on lines 306 and 308 to accept the second and third bit values, respectively. The calculator circuit 328 has an output on line 326 to supply amplitude modifier signals (z) responsive to a comparison of the second and third bit values. In some aspects of the system 300, the calculator circuit 328 supplies amplitude modifier signals that compensate for the effect of the second and third bit values being equal. The second and third bits being equal is a condition that is likely to require extensive inter-symbol interference compensation.

The calculator circuit 328 supplies a unity amplitude modifier signal in response to the only one of the second and third bit values being a "1" value. That is, a unity amplitude modifier is supplied if the second bit is a "0" and the third bit is a "1", or if the second bit is a "1" and the third bit is a "0". When the unity amplitude modifier signal is received by the multiplier 316, the first bit input is amplified by a factor of 1, or a factor of approximately 1. These factors may be considered approximate in the unity amplitude modifier signal, or the high/low amplitude modifier signals presented below, may be slightly offset to fine tune channel equalization, adjust for phase, or tune for other factors that are necessary for the understanding of the instant invention. It should also be understood that "unity" gain is a relative modifier that must be measured with respect to the high and low amplitude modifier signals. For example, the multiplier may generate a dc offset or constant gain that is applied to the multiplier output regardless of the amplitude modifier signal.

Figure 5:
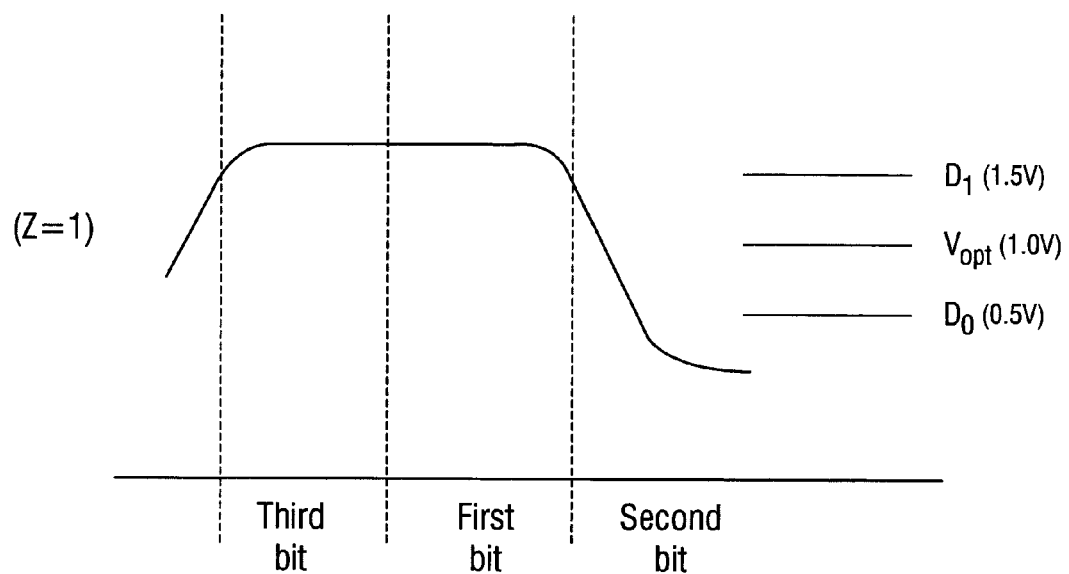
FIG. 5 is a diagram depicting the serial data stream in a condition where the second and third bits are not equal.

FIG. 5 is a diagram depicting the serial data stream in a condition where the second and third bits are not equal. As shown, the second bit value is "0" and the third bit value is a "1". The first bit input, in this case a "1" bit, is multiplied (z=1) by a factor of 1 and compared to the Vopt threshold of 1.0 volts. As a result of the comparison, a "1" first bit value is generated.

Figures 6, 7:
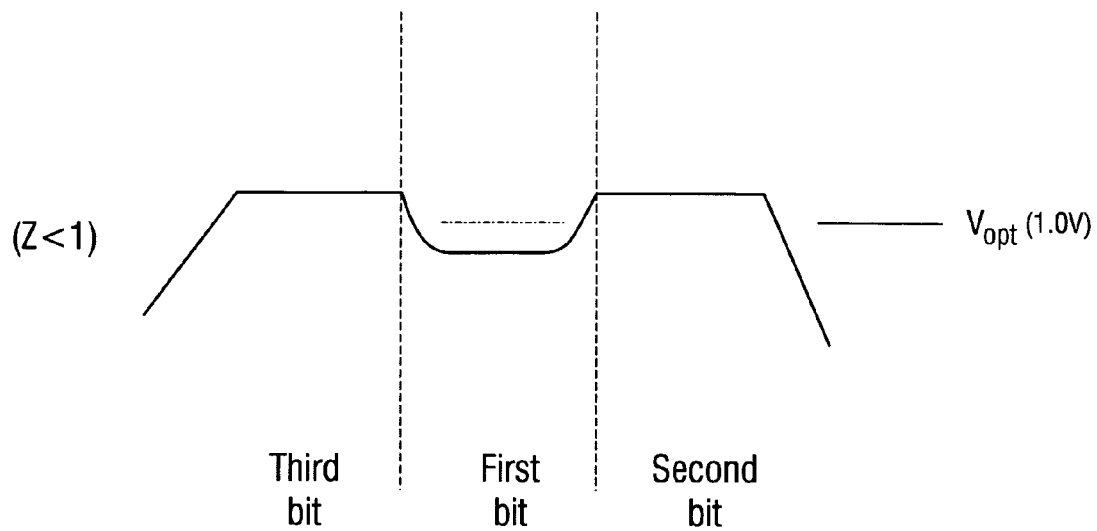
FIG. 6 is a diagram depicting the serial data stream in a condition where the second and third bits are both a "1" value.
FIG. 7 is a diagram illustrating the use of three different thresholds to determine the first bit value in light of the second and third bit values.

FIG. 6 is a diagram depicting the serial data stream in a condition where the second and third bits are both a "1" value. The calculator circuit supplies a low amplitude modifier signal (z<1) in response to both the second and third bit values being a "1" value. In the case shown, the amplitude reduced first bit input is compared to the Vopt threshold. Since the first bit input is less than the threshold, a "0" bit value is generated.

FIG. 7 is a diagram illustrating the use of three different thresholds to determine the first bit value in light of the second and third bit values. Viewing both FIGS. 7 and 5, the use of the low amplitude modifier signal is similar to using the high value (D1) threshold to make a comparison to a first bit input that has not been gain modified. A higher threshold is used to account for the fact the first bit input voltage is likely to be "pulled" up when the previous and subsequent bits are both "1" values.

Figures 8, 9:
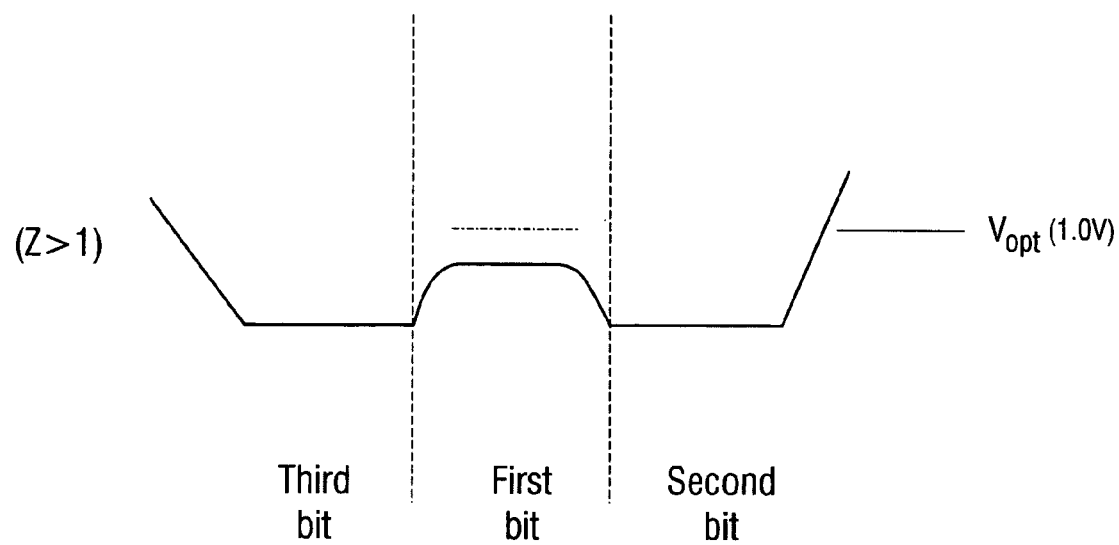
FIG. 8 is a diagram depicting the serial data stream in a condition where the second and third bits are both a "0" value.
FIG. 9 is a diagram illustrating the amplitude modifier signal values cross-referenced to the second and third bit values.

FIG. 8 is a diagram depicting the serial data stream in a condition where the second and third bits are both a "0" value. The calculator circuit supplies a high amplitude modifier signal (z>1) in response to both the second and third bit values being a "0" value. In the case shown, the amplitude enhanced first bit input is compared to the Vopt threshold. Since the first bit input is less than the threshold, a "0" bit value is generated. Returning briefly to FIGS. 5 and 7, the use of the high amplitude modifier signal is similar to using the low value (D0) threshold to make a comparison to a first bit input that has not been amplitude modified. A lower threshold is used to account for the fact the first bit input voltage is likely to be "pulled" down when the previous and subsequent bits are both "0" values.

Returning to FIG. 3, in some aspects of the system 300 the modified gain decision circuit 302 receives a serial data stream encoded with forward error correction (FEC). Then, the system 300 further comprises an FEC circuit 330 having an input on line 310 to accept first bit values and an output on line 332 to supply FEC corrected first bit values. A statistics circuit 334 has an input on line 310 to accept first bit values and an input on line 332 to accept the FEC corrected first bit values. The statistics circuit 334 has an output on line 336 to supply corrections in response to comparing the first bit values to the FEC corrected first bit values. Then, the calculator circuit 328 supplies amplitude modified signals responsive to the corrections on line 326. That is, the FEC circuit 330 and statistics circuit 334 can be used to generate corrections that either directly or indirectly affect the Vopt, D1 and D0 values. It should also be understood that the Vopt, D1, and D0 threshold values can alternately be generated through the analysis of average voltage patterns and/or the analysis of data sequences. This average voltage and data sequence analysis may be conducted with or without the use of FEC corrections, as it should be understood that the serial data stream on line 304 need not necessarily be FEC encoded. Additional details of correction analysis and threshold adjustment are provided in the above-mentioned related applications, which are incorporated herein by reference. It should also be understood that the Vopt, D1, and D0 thresholds may be generated by other, undisclosed means. The present invention system is not dependent on any particular method of generating these thresholds.

With respect to the analysis of data sequences, an analysis can be made of "0" first bit value occurrences when: the second and third bits are both "0" values; the second bit is a "1" value and the third bit is a "0" value; the second bit value is a "0" and the third bit is a "1" value; or, the second and third bits are both "1" values.

Likewise, statistics of the number of corrections in the first bit can be made when the first bit is determined to be a "1" value and: the second and third bits are both "0" values; the second bit is a "1" value and the third bit is a "0" value; the second bit value is a "0" and the third bit is a "1" value; or, the second and third bits are both "1" values.

The eight patterns mentioned above correspond to the four probability density functions described in the Functional Description Section, below. Note that not every pattern, or correction statistic need be used in the calculation of a particular threshold. Further, each threshold may be calculated in response to a different group of statistics. In addition, the calculation of some thresholds may be an indirect result of statistical analysis. For example, D1 and D0 may be determined in response to statistical analysis, while Vopt is set midway between D1 and D0. In other aspects of the system, the total number of first bit "0" value errors and the total number of first bit "1" value errors are used to generate error statistics. Then, the thresholds can be set in reference to a combination of ten different correction statistics.

The following is an example of a simple means of updating Vopt, D1, and D0 in response to changing channel conditions. The first bit input on line 318 is the serial data stream, delayed by one sample time (1/T), or bit period.

If, the first, second (past), and third (future) bit values are equal to "1", then:

D1=loop_constant*(delayed stream−D1);

where the "delayed stream" is the voltage value on line 318.

If, the first, second, and third bit values are equal to "0", then:

D0=loop_constant*(delayed stream−D0); and,

Vopt=loop_constant*(stream−Vopt);

where the stream is the voltage value on line 304;

where loop_constants values are real numbers close to the value of "1", but smaller; and, where there is a sample delay between stream and delayed stream.

In some aspects of the system 300, the modified gain decision circuit 302 further includes a delay 350 having an input on line 304 to accept the serial data stream and an output on line 318 to supply the first bit input delayed with respect to the serial data stream. Typically, the delay is equal to a single bit period. However, the delay may be adjusted or offset to account for the effects of phase distortion or to fine tune the non-causal equalization in response to mechanisms that are not shown and that not essential for the understanding of the instant invention.

The feed-forward equalizer 312 includes a second comparator 352 having an input on line 304 to accept the serial data stream, an input on line 354 to accept the Vopt threshold, and an output on line 308 to supply the third bit value. Typically, the first comparator 322 Vopt value is the same as the second comparator 352 Vopt value. However, in some aspects of the system 300, the two Vopt thresholds can be offset from each other to fine tune the non-causal equalization in response to mechanisms that are not shown and that not essential for the understanding of the instant invention. The feedback equalizer 314 includes a latch 356 having an input on line 310 connected to the first comparator output and an output on line 306 to supply the second bit values. The latch 356 can be a flip/flop, for example, to cause a delay of one bit (clock) period. In other aspects of the system 300, the latch 356 can be a mechanism that adjusts the delay to account for the effects of phase distortion, or to fine tune the non-causal equalization in response to mechanisms that are not shown and that not essential for the understanding of the instant invention.

The calculator circuit 328 has a input on line 358 to accept the D0 comparator threshold, for distinguishing high probability "0" first bit values. The calculator circuit 328 has an input on line 360 to accept a D1 comparator threshold to distinguish high probability "1" first bit values. Alternately stated, in a three-threshold non-causal equalization system, any serial data input above a D1 threshold is a "1" bit, regardless of the second and third bit values, is a "1" and any input below a D0 threshold is a "0". The calculator circuit 328 supplies a low gain amplitude modifier (z=Vopt/D1), and a high gain amplitude modifier (z=Vopt/D0). Using the arbitrary values of Vopt=1.0 volts (V), D1=1.5 V, and D0=0.5 V, then the low gain amplitude modifier is z=1.0/1.5=0.66. The high gain amplitude modifier is z=1.0/0.5=2.

In other aspects of the system these formulas are modified to include additional variables to account for the effects of phase distortion or to fine tune the non-causal equalization process. However, it would be typical for the above-mentioned equations to be dominated by the Vopt, D1, and D0 variables.

In some aspects of the system 300, the calculator circuit 328 is a look up table (LUT), enabled in a memory, including a plurality of stored amplitude modified signals for a plurality of Vopt, D1, and D0 threshold values. That is, the LUT 328 is loaded with a plurality of pre-calculated amplitude modifiers. In other aspects, the LUT 328 selects different sets of amplitude modifier signals from memory in response to changes or corrections in the D1 and D0 values. Likewise, the LUT 328 can be designed to accommodate changes in the Vopt value.

For simplicity sake, it has been assumed in the above discussions that serial data input signal is a non-return to zero (NRZ) signal with an independent accompanying clock signal (not shown), or a signal from which the clock signal must be derived. Alternately, serial data input can be return to zero (RZ), binary symmetric, binary asymmetric, any binary communication protocol where the clock is recovered from the data stream, or any binary communication protocol where the clock is supplied as an independent signal.

It should also be understood that a plurality of serial data input streams may be received with a predetermined phase relationship between the data streams. Then, the system would include a corresponding plurality of modified gain feed-forward/feedback non-causal systems, one for each data stream, and a decoding block (not shown) to decode the phase relationship between the received data streams. That is, the present invention system is also applicable to multi-channel systems where a plurality of serial data inputs are combined into a multi-level phase-shift keying or multi-level quadrature amplitude modulation format. The present invention system is applicable to channel equalizing multiple lines of parallel data, such as a 32-bit data bus for example.

FIG. 9 is a diagram illustrating the amplitude modifier signal values cross-referenced to the second and third bit values.

Functional Description

In some aspects of the system, not shown, a timing recovery circuit is used to generate a clock and sample signal from the received data. The sample signal is synchronized to the center of the data bit. In this implementation, a method for offsetting the sample point is provided to compensate device or channel specific anomalies. Note, in other aspects a data clock is supplied as a signal independent of the data.

Although the non-causal system need not necessarily operate on FEC encoded data, it can be used as a high performance decision device prior to FEC decoding. FEC decoding provides additional information on the validity of the estimates made by the non-causal circuit as a by-product of the error correction procedure. This information can be processed and used to optimize the amplitude modified signal values. Error rate information on the relative probability of a ones ("1s") error vs. a zeros ("0s") error is collected for the four cases of the probability density function (PDF). Specifically:

PDF 1) P(errorred one|no neighboring 1s)
P(errorred zero|no neighboring 1s)
PDF 2) P(errorred|one preceding neighbor 1)
P(errorred zero|preceding neighbor 1)
PDF 3) P(errorred one|following neighbor 1)
P(errorred zero|following neighbor 1)
PDF 4) P(errorred|one two neighboring 1s)
P(errorred zero|two neighboring 1s)

Since FEC encoded systems are typically scrambled to insure a 50% mark ratio, statistical data for each of the three cases can be reduced to a ratio. Each threshold can be adjusted to achieve the ones/zero ratio that provides the best fit for the channel in use. In many cases this will be ~50%. For cases in which dispersion is symmetric, PDF 2 and PDF 3 are combined to a single statistic.

In addition, statistics can be collected for the total number of corrected "0"s and the total number of corrected "1"s. Note that the statistics for the number of corrected "0"s and "1"s can be determined from an analysis of the above-mentioned eight patterns, called PDF1 through PDF4. These 10 statistics (the eight PDF patterns, plus the two total error sums) can be used to control the threshold levels. For example, D1 may be set in response to S(101)+S(111)−S(011), where S(101) represents the accumulated "0" errors when the neighboring (second and third) bit values are "1"s, where S(111) represents the accumulated "1" errors when the neighboring bit values are both "1"s, and where S(011) represents the accumulated "1" errors when the preceding bit value is a "0" and the subsequent bit value is a "1". Thus, any of the amplitude modified signals can be set in response to various combinations of the above-mentioned 10 statistics. The present invention is not limited to an analysis of any particular number or type of the above-mentioned statistics. Neither is the invention necessarily limited to the analysis of just these 10 statistics, as other statistics, although perhaps more complicated and processor intensive, can be collected in response to selected bit value sequences.

Figure 10:
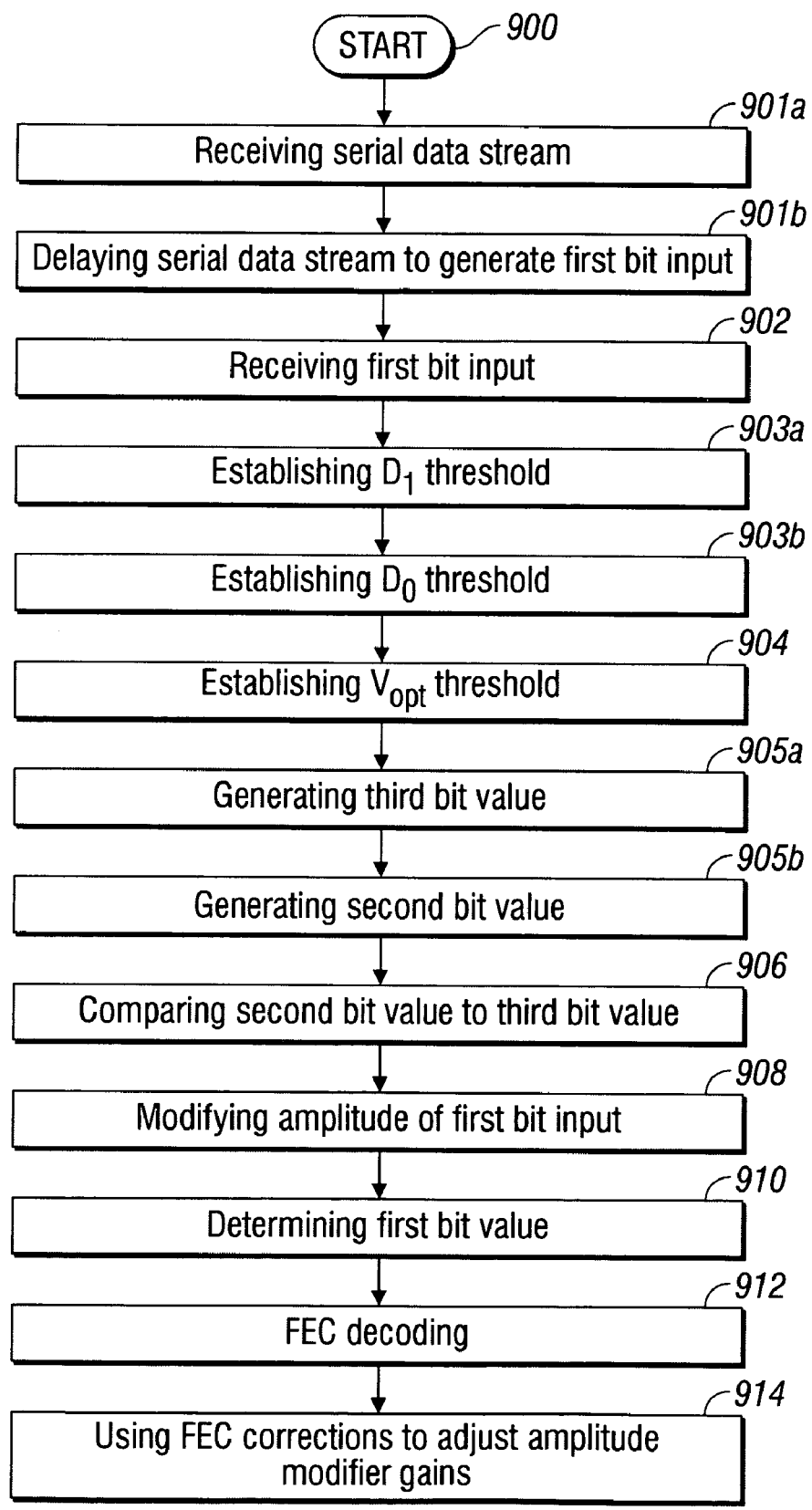
FIG. 10 is a flowchart illustrating the present invention modified gain method for a non-causal channel equalization communications system using feed-forward and feedback compensation.

FIG. 10 is a flowchart illustrating the present invention modified gain method for a non-causal channel equalization communications system using feed-forward and feedback compensation. This method generally corresponds to the system of FIG. 3. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 900

Step 902 receives a first bit (present) input. Step 904 establishes a comparator threshold (Vopt) to distinguish "1" bit values from "0" bit values. Step 906 compares a second bit (past) value, received prior to the first bit input, to a third bit (future) value received subsequent to the first bit input. Step 908, in response to the comparisons, modifies the amplitude of the first bit input. Step 910 determines the value of the first bit input.

In some aspects, modifying the amplitude of the first bit input in response to the comparisons (Step 908) includes modifying the amplitude to compensate for the effect of the second and third bit values being equal. Determining the value of the first bit input (Step 910) includes compares the amplitude modified first bit input to the Vopt threshold.

In one aspect of the method, comparing a second bit value to a third bit value (Step 906) includes only one of the second and third bit values being a "1" value. Then, modifying the amplitude of the first bit input (Step 908) includes supplying a unity amplitude modifier in response to only one of the second and third bit values being a "1" value. In another aspect, comparing a second bit value to a third bit value includes both the second and third bit values being a "1" value. Then, modifying the amplitude of the first bit input in Step 910 includes supplying a low amplitude modifier in response to both the second and third bit values being a "1" value.

In a different aspect, Step 906 compares a second bit value to a third bit value when the second and third bit values are both a "0" value. Then, modifying the amplitude of the first bit input in Step 910 includes supplying a high amplitude modifier in response to both the second and third bit values being a "1" value.

Other aspects of the method include additional steps. Step 901*a* receives a serial data stream. Step 901*b* delays the serial data stream to generate the first bit input. Typically, the delay is one-bit period. Step 905*a* compares the serial data stream to the Vopt threshold to generate the third bit value. Step 905*b* delays a previously generated first bit value to generate the second bit value.

In one particular implementation of the method, receiving a serial data stream in Step 901*a* includes receiving a serial data stream encoded with forward error correction (FEC). Then, the method comprises further steps. Step 912, following the determination of the first bit values, FEC decodes the first bit values. Step 914 uses the FEC corrections of the first bit values to adjust the amplitude modifier gains. As mentioned above, the calculation is Vopt, D1, and D0 may also be made by other means, and the determination of these values is not essential to the understanding of the present invention method.

In other aspects, Step 903*a* establishes a D1 comparator threshold to distinguish high probability "1" first bit values. Step 903*b* establishes a D0 comparator threshold to distinguish high probability "0" first bit values. Then, supplying a low amplitude modifier (Step 908) includes supplying a low amplitude modifier (z=Vopt/D1). Supplying a high amplitude modifier includes supplying a high amplitude modifier (z=Vopt/D0).

In some aspects of the method, receiving a serial data stream (Step 901*a*) includes receiving a serial data stream such as non-return to zero (NRZ), return to zero (RZ), binary symmetric, binary asymmetric, binary communication protocols where the clock is recovered from the data stream, or binary communication protocols where the clock is supplied as an independent signal.

A system and method have been provided for adjusting a serial data stream channel by modifying the channel gain in response to a non-causal analysis. Because inter-symbol dispersion is a non-causal impairment, the estimation algorithms are more effective when based upon iteratively collected data. The degree of iteration affects the performance of the circuit and is selected based upon the implementation tradeoffs. It is expected that those skilled in the art could implement the collection of such data. Although exemplary analysis algorithms using only the preceding and subsequent bits have been explicitly described, the present invention would obviously apply to algorithms using more than one preceding or subsequent bit value. Further, although the present invention has generally been described in the context of a single serial data input, it should be understood that the invention is equally applicable to a system that receives multiple serial lines in parallel, and decodes the channel equalized data as multi-level QAM or as a parallel data bus word. Other embodiments and variations of the invention will occur to those skilled in the art.

We claim:

1. In a communications system, a modified gain method for non-causal channel equalization using feed-forward and feedback compensation, the method comprising:
   receiving a first bit input;
   comparing a second bit value, received prior to the first bit input, to a third bit value received subsequent to the first bit input;
   in response to the comparisons, modifying the amplitude of the first bit input; and,
   determining the value of the first bit input.

2. The method of claim 1 further comprising:
   establishing a comparator threshold Vopt to distinguish "1" bit values from "0" bit values; and,
   wherein determining the value of the first bit input includes comparing the amplitude modified first bit input to the Vopt threshold.

3. The method of claim 2 wherein modifying the amplitude of the first bit input in response to the comparisons includes modifying the amplitude to compensate for the effect of the second and third bit values being equal.

4. The method of claim 2 wherein comparing a second bit value to a third bit value includes only one of the second and third bit values being a "1" value; and,
   wherein modifying the amplitude of the first bit input includes supplying a unity amplitude modifier in response to only one of the second and third bit values being a "1" value.

5. The method of claim 2 wherein comparing a second bit value to a third bit value includes both the second and third bit values being a "1" value; and,
   wherein modifying the amplitude of the first bit input includes supplying a low amplitude modifier in response to both the second and third bit values being a "1" value.

6. The method of claim 2 wherein comparing a second bit value to a third bit value includes both the second and third bit values being a "0" value; and,
   wherein modifying the amplitude of the first bit input includes supplying a high amplitude modifier in response to both the second and third bit values being a "0" value.

7. The method of claim 2 further comprising:
   receiving a serial data stream;
   comparing the serial data stream to the Vopt threshold to generate the third bit value;
   delaying the serial data stream period to generate the first bit input; and,
   delaying a previously generated first bit value to generate the second bit value.

8. The method of claim 7 wherein receiving a serial data stream includes receiving a serial data stream encoded with forward error correction (FEC);
   the method further comprising:
   following the determination of the first bit values, FEC decoding the first bit values; and, using the FEC corrections of the first bit values to adjust the amplitude modifier gains.

9. The method of claim 7 further comprising:
establishing a D1 comparator threshold to distinguish high probability "1" first bit values;
establishing a D0 comparator threshold to distinguish high probability "0" first bit values;
wherein modifying the amplitude of the first bit input includes a modification selected from a group consisting of:
supplying a unity amplitude modifier in response to only one of the second and third bit values being a "1" value;
supplying a low amplitude modifier in response to both the second and third bit values being a "1" value, where z=Vopt/D1; and,
supplying a high amplitude modifier in response to both the second and third bit values being a "0" value, where z=Vopt/D0.

10. The method of claim 1 wherein receiving a serial data stream includes receiving a serial data stream selected from the group including non-return to zero (NRZ), return to zero (RZ), binary symmetric, binary asymmetric, binary communication protocols where the clock is recovered from the data stream, and binary communication protocols where the clock is supplied as an independent signal.

11. A modified gain non-causal channel equalization communication system using feed-forward and feedback compensation, the system comprising:
a modified gain decision circuit having an input to accept a serial data stream, an input to accept a second bit value received prior to a first bit input, an input to accept a third bit value received subsequent to the first bit input, and an output to supply a first bit value responsive to the second and third bit values;
a feed-forward equalizer having an input to accept the serial data stream and an output to supply third bit values; and,
a feedback equalizer having an input to accept first bit values and an output to supply second bit values.

12. The system of claim 11 wherein the modified gain decision circuit includes:
a multiplier having an input to accept first bit inputs and an output to supply amplitude modified first bit inputs; and,
a first comparator having an input to accept the amplitude modified first bit inputs, an input to accept a Vopt comparator threshold, and an output to supply the first bit values.

13. The system of claim 12 wherein the multiplier further includes an input to accept an amplitude modifier signals;
wherein the modified gain decision circuit further includes a calculator circuit having inputs to accept the second and third bit values and an output to supply amplitude modifier signals responsive to a comparison of the second and third bit values.

14. The system of claim 13 wherein the calculator circuit supplies amplitude modifier signals that compensate for the effect of the second and third bit values being equal.

15. The system of claim 13 wherein the calculator circuit supplies a unity amplitude modifier signal in response to the only one of the second and third bit values being a "1" value.

16. The system of claim 13 wherein the calculator circuit supplies a low amplitude modifier signal in response to both the second and third bit values being a "1" value.

17. The system of claim 13 wherein the calculator circuit supplies a high amplitude modifier signal in response to both the second and third bit values being a "0" value.

18. The system of claim 13 wherein the modified gain decision circuit receives a serial data stream encoded with forward error correction (FEC);
the system further comprising:
an FEC circuit having an input to accept first bit values and an output to supply FEC corrected first bit values;
a statistics circuit having an input to accept first bit values and FEC corrected first bit values and an output to supply corrections in response to comparing the first bit values to the FEC corrected first bit values; and,
wherein the calculator circuit supplies amplitude modified signals responsive to the corrections.

19. The system of claim 13 wherein the modified gain decision circuit further includes a delay having an input to accept the serial data stream and an output to supply the first bit input delayed with respect to the serial data stream.

20. The system of claim 19 wherein the feed-forward equalizer includes a second comparator having an input to accept the serial data stream, an input to accept the Vopt threshold, and an output to supply third bit values.

21. The system of claim 20 wherein the feedback equalizer includes a latch having an input connected to the first comparator output, and an output to supply the second bit values.

22. The system of claim 13 wherein the calculator circuit has a input to accept a D1 comparator threshold to distinguish high probability "1" first bit values, and an input to accept a D0 comparator threshold to distinguish high probability "0" first bit values; and,
wherein the calculator circuit supplies an amplitude modifier signal selected from a group consisting of a unity amplitude modifier in response to the only one of the second and third bit values being a "1" value, a low gain amplitude modifier in response to both the second and third bit values being a "1" value, where z=Vopt/D1, and a high gain amplitude modifier, in response to both the second and third bit values being a "0" value, where z=Vopt/D0.

23. The system of claim 22 wherein the calculator circuit is a look up table (LUT) including a plurality of stored amplitude modified signals for a plurality of Vopt, D1, and D0 threshold values.

24. The system of claim 11 wherein the modified gain circuit receives a serial data stream input selected from the group including non-return to zero (NRZ), return to zero (RZ), binary symmetric, binary asymmetric, binary communication protocols where the clock is recovered from the data stream, and binary communication protocols where the clock is supplied as an independent signal.

* * * * *